United States Patent [19]

Therrien

[11] Patent Number: 4,523,231

[45] Date of Patent: Jun. 11, 1985

[54] METHOD AND SYSTEM FOR AUTOMATICALLY DETECTING CAMERA PICTURE ELEMENT FAILURE

[75] Inventor: Roger H. Therrien, Waterloo, Canada

[73] Assignee: NCR Canada Ltd - NCR Canada Ltee, Mississauga, Canada

[21] Appl. No.: 461,056

[22] Filed: Jan. 26, 1983

[51] Int. Cl.³ .............................................. H04N 5/30
[52] U.S. Cl. .................................... 358/139; 358/213
[58] Field of Search ............... 358/209, 212, 213, 139, 358/106; 315/151

[56] References Cited

U.S. PATENT DOCUMENTS

| | | | |
|---|---|---|---|
| 3,676,587 | 7/1972 | Kline | 358/139 |
| 3,697,674 | 10/1972 | Brewington | 358/139 |
| 3,717,077 | 2/1973 | Harvey | 95/10 CE |
| 3,944,816 | 3/1976 | Harada | 250/211 J |
| 4,167,755 | 9/1979 | Nagumo | 358/213 |
| 4,174,528 | 11/1979 | White | 358/280 |
| 4,189,751 | 2/1980 | Nagumo | 358/213 |
| 4,228,468 | 10/1980 | Nagano et al. | 358/280 |
| 4,287,536 | 9/1981 | Wiggins | 358/282 |
| 4,298,887 | 11/1981 | Rode | 358/113 |
| 4,305,658 | 12/1981 | Yoshida | 356/23 |
| 4,382,267 | 5/1983 | Angle | 358/213 |
| 4,415,927 | 11/1983 | Penny | 358/139 |
| 4,423,436 | 12/1983 | Kimura | 358/98 |
| 4,454,541 | 7/1984 | Duschl | 358/106 |

FOREIGN PATENT DOCUMENTS

| | | | |
|---|---|---|---|
| 67213 | 6/1977 | Japan | 358/139 |
| 6716 | 1/1979 | Japan | 358/139 |
| 6715 | 1/1979 | Japan | 358/139 |
| 2095878 | 10/1982 | United Kingdom | |

Primary Examiner—Gene Z. Rubinson
Assistant Examiner—Robert Lev
Attorney, Agent, or Firm—Albert L. Sessler, Jr.; George Jameson

[57] ABSTRACT

A system and method are disclosed for detecting picture element failures in a multielement array. In a preferred embodiment of the invention the illumination of a reference background by a lamp is controlled by a controlled power supply to be off in a first mode of operation and on in a second mode. During a diagnostic operation, the reference background is scanned by a N element CCD array t provide N reference pixels for each scan during each of the first and second modes of operation. During the first mode, a first error signal is developed for each of the N reference pixels in a first mode scan that is greater than a first reference signal level. During the second mode, a second error signal is developed for each of N reference pixels in a second mode scan that is less than a second reference level. These first and second signals are then respectively utilized by a first counter to store the total number of pixel errors detected in a first preselected scan during the first mode and a second counter to store the total number of pixel errors detected in a second preselected scan during the second mode. The counts of these first and second counters are then utilized in conjunction with address and control signals to selectively store in associated first and second circuits the associated numbers or addresses of the defective elements in the array for each of the first and second modes of operation.

17 Claims, 8 Drawing Figures

METHOD AND SYSTEM FOR AUTOMATICALLY DETECTING CAMERA PICTURE ELEMENT FAILURE

CROSS-REFERENCE TO RELATED PATENT APPLICATIONS

The commonly assigned U.S. Patent application Ser. No. 435,014, filed Oct. 15, 1982, for "Automatic Light Control System", inventors Roger H. Therrien and Maninderpal S. Chahal, and U.S. Ser. No. 450,582 filed 12-17-82, now U.S. Pat. No. 4,509,077, issued 4-2-85 for "Automatic, Self Diagnosing, Electro-Optical Imaging System", inventor Roger H. Therrien, are related to this application.

BACKGROUND OF THE INVENTION

1. Field of the Invention

This invention relates to an electro-optical imaging apparatus and more particularly to an electro-optical imaging system, having at least one array of N image viewing or picture elements, which automatically detects any picture element failures.

2. Description of the Prior Art

In the electronic art of electro-optical imaging, raster scanners employing at least one array comprised of a plurality of image viewing elements are being increasingly used. Such multielement arrays may be comprised of, for example, a charge coupled device (CCD) array or a photodiode array.

Many different types of apparatuses and systems have been proposed for controlling the operation of such imaging equipment. Prior art raster scanners employing multielement arrays have been proposed for controlling the integration time of the arrays (see U.S. Pat. Nos. 3,944,816 and 4,174,528), controlling the gain of the arrays (see U.S. Pat. Nos. 3,717,077 and 4,287,536), correcting for variations in the outputs of individual elements (see U.S. Pat Nos. 4,228,468 and 4,298,887) and removing the noise caused by defects in the semiconductor crystal of the CCD device (see U.S. Pat. Nos. 4,167,755 and 4,189,751).

All of the above-described apparatuses and systems are basically directed to controlling various operational aspects of electro-optical imagers employing at least one multielement array.

Applicant's above-described U.S. Patent application Ser. No. 450,582, for "Automatic, Self Diagnosing, Electro-Optical Imaging System" uses signals, including the center pixel of at least one array in an electro-optical imaging system to perform self-diagnostic tests on itself. This self-diagnosing system utilizes a center pixel derived from an imaging sensor to determine whether or not an associated video processor is defective.

None of the above-described apparatuses or systems teaches or suggests any means for testing each of the elements in a multielement array to detect and identify picture element (pixel) failures.

The background art known to the applicant at the time of the filing of this application is as follows:

U.S. Pat. No. 3,717,077, Exposure Control Apparatus, by Harvey;

U.S. Pat. No. 3,944,816, Charge Transfer Apparatus Having Light Sensitivity Control Means, by Harada;

U.S. Pat. No. 4,167,755, Solid State Television Camera, by Nagumo;

U.S. Pat. No. 4,174,528, Exposure Control For Document Scanner Arrays, by White;

U.S. Pat. No. 4,189,751, Solid State Television Camera With Defect Compensation To Reduce Noise, by Nagumo;

U.S. Pat. No. 4,228,468, Output Correcting System For Facsimile, by Nagano et al.;

U.S. Pat. No. 4,287,536, Gain Control For Scanning Arrays, by Wiggins; and

U.S. Pat. No. 4,298,887, Non-Uniformity Correction In A Multielement Detector Array, by Rode.

SUMMARY OF THE INVENTION

In a preferred embodiment of the invention, a power supply is controlled by a control circuit to prevent a light source from illuminating a reference background during a first mode of operation of the control circuit and to enable the light source to illuminate the reference background during a second mode of operation of the control circuit. During a diagnostic operation, a raster scanner having at least one array containing N image viewing elements provides N reference signal pixels for each scan of the reference background during each of the first and second modes of operation.

A pixel error detection circuit is then utilized to determine if there are any errors in the reference signal pixels and, if so, to determine the total number of errors and their respective pixel numbers for each of the first and second modes of operation. More specifically, a first error signal is developed each time that one of the reference signal pixels, derived from a first mode scan, is greater than a first signal level. A second error signal is developed each time that one of the reference signal pixels, derived from a second mode scan, is less than a second signal level. These error signals are then utilized in conjunction with address and control signals to enable the pixel error detection circuits to selectively store in first associated circuits the total number of pixel errors for each of the first and second modes of operation and to selectively store in second associated circuits the specific location of the defective elements for each of the first and second modes of operation.

External circuitry is also provided to initiate a diagnostic operation and/or an evaluation operation to selectively read out the stored total number of pixel errors and identity of each defective element in the array for each of the first and second modes of operation.

It is, therefore, an object of this invention to provide a novel system and method for automatically detecting any camera picture element failures.

Another object of this invention is to provide a novel system and method for automatically detecting and identifying any camera picture element failures during each of first and second modes of operation.

Another object of this invention is to provide a novel electro-optical imaging system, having at least one array of image viewing or picture elements, for automatically detecting any picture element failures.

A further object of this invention is to provide an electro-optical system having at least one multi-element array raster scanner for automatically detecting any picture element failures during each of first and second modes of operation.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings, wherein like reference numerals indicate like or corresponding parts throughout the several views and wherein.

DESCRIPTION OF THE PREFERRED EMBODIMENT

Figure 1:
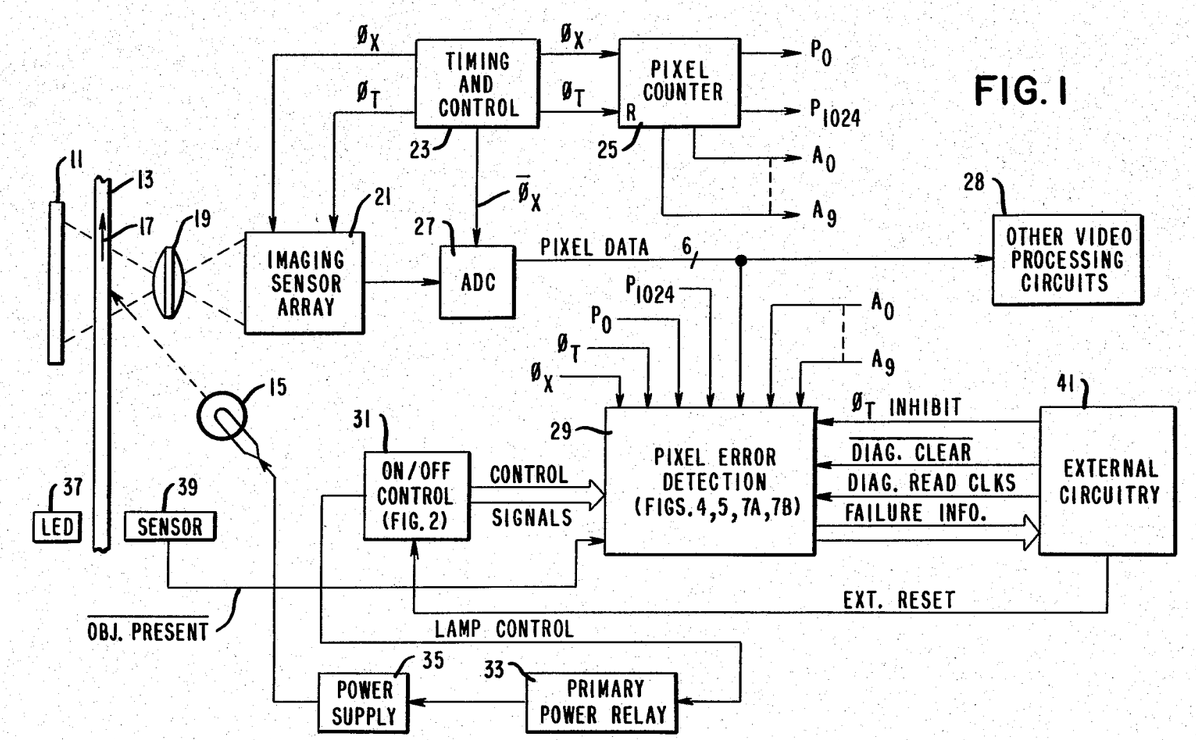
FIG. 1 is a schematic block diagram of a preferred embodiment of the invention.

Referring now to the drawings, FIG. 1 discloses a schematic block diagram of a preferred embodiment of the invention. The invention is shown in a video camera environment or application for scanning information from objects or documents.

In the normal imaging of an object, the following operation occurs. A reference background 11, which is preferably white in color, is mounted near or adjacent to a moving track or moving conveyor line or mounted on a rotating drum 13. When no object is present, the reference background is illuminated by radiant energy, such as by light from a suitable light source or lamp 15. An object or document 17 to be imaged can be either stationary or transported by the moving track, moving conveyor line or rotating drum 13 along a path between the reference background 11 and a lens assembly 19. As the object 17 is moved across the reference background, it is illuminated by the light source 15. A reflected optical image of the object 17 is focused by the lens assembly 19 onto the face of an imaging sensor array 21. The imaging sensor array 21 could comprise any suitable array such as, for example, an array of photodiodes, a photoarray or a charge coupled device (CCD) array.

For purposes of this description, the array 21 is a 1024-element CCD array such as, for example, a Model 133/143 CCD, manufactured by CCD Imaging Products Division, Fairchild Camera & Instrument Corporation.

Transport clocks $\phi_x$ and transfer clocks $\phi_T$ from a timing and control circuit 23 enable the imaging sensor array 21 to generate a plurality of scan lines of an object 17 as the object traverses the scan position of the array 21. Each scan line of the array 21 develops 1024 picture elements or pixels, with each pixel having a particular one of 64 gray scale values, which value represents a portion of the object 17 being scanned. The composite of these scan lines of the object provides a signal image of the object 17 being scanned.

Transport clocks $\phi_x$ control the readout rate of video data from the 1024. cells in the imaging sensor array 21 at a rate of approximately 270 nanoseconds per pixel. A transfer clock $\phi_T$ occurs at the end of each line scan and controls the integration time of the array 21. This so-called integration time of the array 21 is analogous to the exposure time in conventional cameras. The scan interval or interpulse period of the transfer clock $\phi_T$ is approximately 285 micro-seconds.

Each transport clock $\phi_X$ increments an 11-bit, synchronous, binary pixel counter 25 by one, causing its output to sequentially develop address counts or addresses from 0 to 1063. The pixel clocks $\phi_X$ which occur between the addresses 0 through 1023 are used to sequentially clock out video pixel signals from the 1024 cells or elements 0 through 1023 of the array 21. The pixel clocks $\phi_X$ which occur between addresses 1024 through 1062 may be utilized to clock out black and white references inside the array 21 for purposes beyond the scope of this invention.

For purposes of synchronization the $\phi_T$ clock, which occurs at the end of a scan and during the pixel count of 1063, is used to synchronously reset the counter 25 to an address count of 0 at the following $\phi_X$ clock time in order to start a new line scan of the array 21.

Counts 0 and 1024 of counter 25 are internally decoded by the counter 25 to develop signals $P_0$ and $P_{1024}$ which respectively represent the first and 1024th transport clocks in each line scan. Although the counter 25 develops an 11-bit output, only the 10 least significant bits A0–A9 are outputted for further utilization by the system.

The logical conversion of each transport clock $\phi_X$, or $\overline{\phi}_X$, is applied from timing and control circuit 23 to enable an analog-to-digital converter (ADC) circuit 27 to digitize the video pixel signals from the array 21 to produce a corresponding scan of digitized pixels or pixel data for each scan line of the array 21. It should be noted that where an imaging sensor array 21 has two output lines or channels, such as are contained in a Fairchild Model 133/143 CCD, the ADC circuit 27 may contain two separate ADCs for respectively digitizing the two channel outputs and, in addition, circuitry for interlacing the two digitized channel outputs into one composite output. CCD interlacing techniques, which form no part of this invention, are described in detail in U.S. Pat. No. 3,911,467.

Each of the digitized pixels from the ADC circuit 27 has a gray scale value which is six bits wide. Each digitized pixel can have one of the 64 gray scale values ranging from completely black (a digital value of 000000) to completely white (a digital value of 111111).

The scans of pixel data from the ADC circuit 27 may be applied to other video processing circuits 28 where, for example, the digitized image of a scanned object 17 can be conventionally reconstructed along X and Y coordinates, scan line by scan line. However, further utilization of the pixel data by other video processing circuits 28 is beyond the purview of this invention and, hence, will not be further discussed.

The invention automatically and repeatedly tests each scan of pixel data from ADC 27 for any defective elements or cells in the imaging sensor array 21 during a "diagnostic operation". In the performance of such tests on the pixel data, the pixel data from ADC 27, the $\phi_X$ and $\phi_T$ clocks from timing and control 27, and the $P_0$ and $P_{1024}$ signals and A0–A9 addresses from pixel counter 25 are applied to a pixel error detection circuit 29.

Because of the different reflectivities of different objects being imaged by the array 21, no pixel data testing can be accurately and repeatably performed by the system of FIG. 1 when an object 17 is being imaged. Consequently, whenever an object 17 is detected in the track 17, a 0 state object (obj.) present signal prevents the detection circuit 29 from testing the pixel data.

To control the timing of the diagnostic operation of the system, an on/off control circuit 31 is included to initiate an initial diagnostic operation of the system after power is initially applied to the system and to initiate a subsequent diagnostic operation each time it receives an external (ext.) reset signal.

Each time that the control circuit 31 initiates a diagnostic operation, it sends control signals to the detection circuit 29 to enable the circuit 29 to sequence through different tests on the pixel data from ADC 27. As long as no object 17 is detected in the track 13, the detection circuit 29 will be enabled by a 1 state obj. present signal to complete a diagnostic operation.

Each time that the control circuit 31 initiates a diagnostic operation, it also supplies a lamp control signal to control the operation of a primary power relay 33 to either supply or not supply primary power (not shown) to a power supply 35 as a function of the amplitude of the lamp control signal.

During a first mode of operation, the lamp control signal has an insufficient amplitude to energize the relay 33. As a result, the power supply 35 provides no power to the lamp 15 and the lamp 15 is "off". With the lamp 15 "off", the imaging sensor array 21 scans the unilluminated reference background 11 (provided that no object 17 is present in the track 13 during this first mode of operation). During this first mode of operation, the control signals from control circuit 31 enable the detection circuit 29 to test the pixel data with the lamp 15 "off".

After a suitable time delay, the control circuit 31 changes the amplitude of the lamp control signal to end the first mode of operation and start the second mode of operation. During the second mode of operation, the control signal has a sufficient amplitude to energize the relay 33. The power supply 35 therefore supplies power to turn "on" the lamp 15. With the lamp 15 "on", the imaging sensor array 21 scans the illuminated reference background 11 (provided that no object 17 is present in the track 13 during this second mode of operation). During this second mode of operation, the control signals from control circuit 31 enable the detection circuit 29 to test the pixel data with the lamp 15 "on".

Once the system has entered the second mode of operation, it remains in this second mode of operation to enable the detection circuit 29 to repeatedly test the pixel data with the lamp 15 "on". However, even this second mode of operation is temporarily interrupted each time that an object 17 to be imaged by the array 21 is detected in the track 13. More specifically, as an object 17 moves down the track 13 toward the reference background 11, it passes between a light emitting diode (LED) 37 and light sensor 39 which are respectively positioned on opposite sides of the track 13. The passage of an object 17 between the elements 37 and 39 interrupts the light path between the LED 37 and sensor 39, causing the sensor 39 to develop a 0 state object (obj.) present signal to temporarily interrupt the operation of the detection circuit 29.

After a suitable time delay after the trailing edge of the object 17 has cleared the path between the LED 37 and sensor 39, the object present signal returns to a 1 state to enable the detection circuit 29 to again test each line scan of pixel data derived from the reference background 11. Such a suitable delay can be readily determined from the known speed of the track 13 after the object 17 clears the path between the LED 37 and sensor 39. This known time delay (not shown) can be readily added to the sensor 39 output.

The pixel failure information that was derived during a diagnostic operation can be examined by external circuitry 41 during an evaluation operation. External circuitry 41 can be any suitable circuit, such as switches, push buttons, a microprocessor or discrete logic, for selectively generating an external reset pulse, a $\emptyset_T$ inhibit signal, a diagnostic clear (diag. clr.) signal and diagnostic read clocks (diag. read clk) to read out any pixel failure information from the detection circuit 29.

Figure 2:
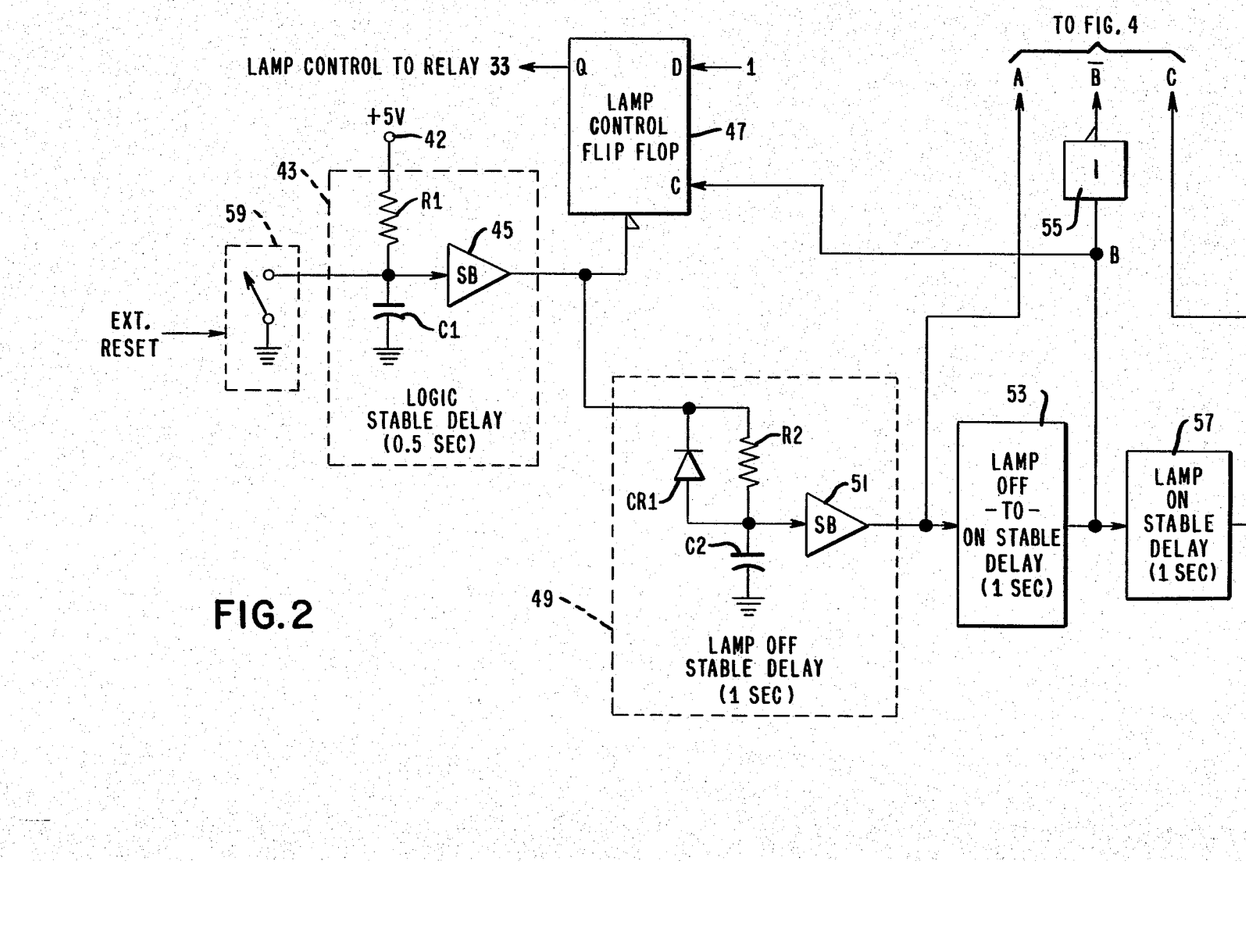
FIG. 2 is a composite schematic block and circuit diagram of the on/off control circuit of FIG. 1.
Figure 3:
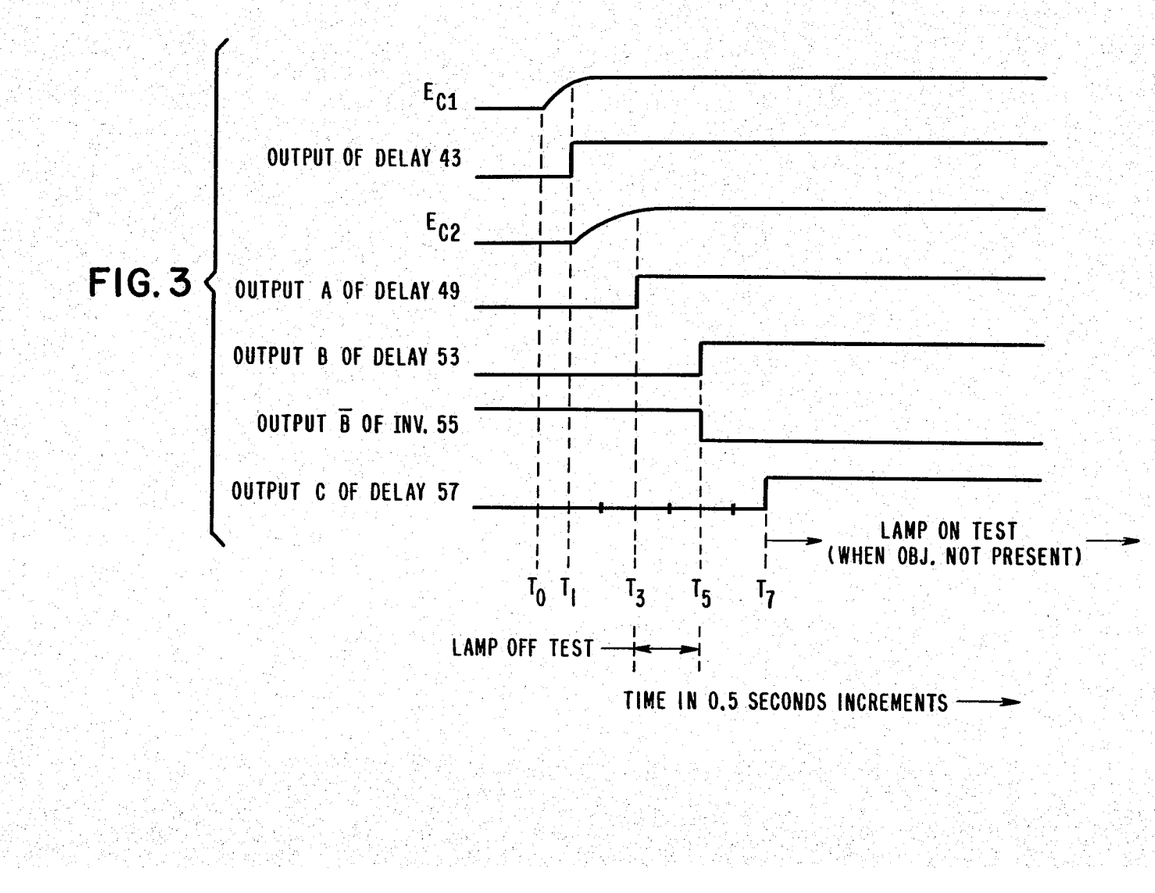
FIG. 3 illustrates waveforms useful in explaining the operation of the on/off, control, circuit of FIG. 1.

Referring now to FIGS. 2 and 3, FIG. 2 illustrates a composite schematic block and circuit diagram of the on/off control circuit 31 of FIG. 1, while FIG. 3 illustrates waveforms useful in explaining the operation of the control circuit 31.

Initially, the system of FIG. 1 is turned off and no power is applied anywhere. At time $T_0$ (FIG. 3), when power is initially applied to the system, power supplies (not shown) are brought up to their operating potentials. A positive five volts (+5 V) from one of the power supplies is applied to a terminal 42 in a one-half second logic stable delay circuit 43. A resistor R1 and capacitor C1 are serially connected to each other between the terminal 42 and ground. The voltage across C1, $E_{C1}$, which is applied to the input of a Schmitt buffer (S.B.) 45, is low at the time the +5 V is applied to the terminal 42. As a result, the output of buffer 45 is also low. This low output of buffer 45 is applied to the clear input of a lamp control flip flop 47, which causes the flip flop 47 to develop at its Q output a low level lamp control signal. The low level lamp control signal from flip flop 47 turns off the relay 31 which, as indicated in FIG. 1, turns off the power supply 35 and, hence, turns off lamp 15.

The purpose of the logic stable delay 43 is to provide a delay of approximately one half of a second for the stabilization of the logic power supplies in the system. At time $T_1$ (FIG. 3) after a delay of approximately one half of a second, the charge $E_{C1}$ on the capacitor C1 has increased to a voltage sufficient to trigger the Schmitt buffer 45 to change its output state from low to high. Thus, the high output of delay 43 removes the clear signal (0 state) from the lamp control flip flop 47. However, until the flip flop 47 is subsequently clocked, it continues to develop a low level lamp control signal.

The high output of delay 43 is also applied to a lamp off stable delay 49 to provide an additional 1 second delay for the lamp 15 to stabilize in its off state.

Within the delay 49 a resistor R2 and capacitor C2 are serially connected to each other between the output of buffer 45 and ground. A diode CR1 is connected in parallel to the resistor R2. The junction of R2 and C2 is connected to the input of a Schmitt buffer 51. In response to the output of buffer 45 changing to a high level, capacitor C2 starts charging up toward that high level. At time $T_3$ (FIG. 3), after a delay of about 1 second, the charge $E_{C2}$ on the capacitor C2 triggers the Schmitt buffer 51 to change its output state from low to high. This output of buffer 51 is the output A of delay 49, as shown in FIG. 3.

In a similar manner, at time $T_3$ the high level output A of delay 49 is also applied to a 1 second lamp off-to-on stable delay 53, which is similar in structure and operation to the delay 49. At time $T_5$, after another 1 second delay, the output B of delay 53 changes from low to high to clock the lamp control flip flop 47 on its rising edge. Upon being clocked, the lamp control flip flop 47 develops at its Q output a high level lamp control signal which energizes the relay 31, causing power supply 35 to be turned on and to turn on lamp 15.

The B signal from the output of delay 53 is inverted by a logical inverter 55 to develop a $\overline{B}$ signal.

As shown in FIG. 3, the lamp off pixel error test was conducted for a period of 1 second between times $T_3$ and $T_5$. During this 1 second period of time, approximately 3500 separate scan lines of pixel data could have been tested for pixel errors after the lamp 15 was turned off and stabilized (provided that no object 17 was detected in the track 13 during this time).

The purpose of the lamp off-to-on stable delay 53 is to provide a delay of approximately 1 second for the lamp 15 to stabilize in its on state before any lamp on pixel error tests are conducted by detection circuit 29 (FIG. 1).

At time $T_5$ the high level output B of delay 53 is also applied to a 1 second lamp on stable delay 57, which is similar in structure and operation to the delay 49. At time $T_7$, after a final 1 second delay, the output C of delay 57 changes from low to high. From time $T_7$ on, the lamp on pixel error test can be conducted on separate scan lines of pixel data after the lamp 15 has been turned on and stabilized (whenever no object 17 is detected in the track 13).

A suitable switch 59, such as an electronic switch, is coupled across capacitor C1. In normal operation switch 59 is open. However, switch 59 is controlled by an external reset signal from external circuitry 41 (FIG. 1) to momentarily close and discharge capacitor C1 to initiate a diagnostic operation whenever desired or required.

It should be noted that the on/off control circuit 31 could have been implemented in a manner different than that shown in FIG. 2 by using, for example, a field programmable logic array (FPLA), a counter and suitable data storage units to obtain the sequence of delays and control signals shown in FIGS. 2 and 3. The FPLA would be programmed to respond to Boolean equations to generate the sequence of delays and control signals for both the lamp 15 "on" and lamp 15 "off" pixel data testing. Furthermore, an analog delay circuit, other than the type illustrated in FIG. 2, also could have been utilized.

The pixel error detection circuit 29 is comprised of the circuits shown in FIGS. 4, 5 and 7, which will now be discussed.

Figure 4:
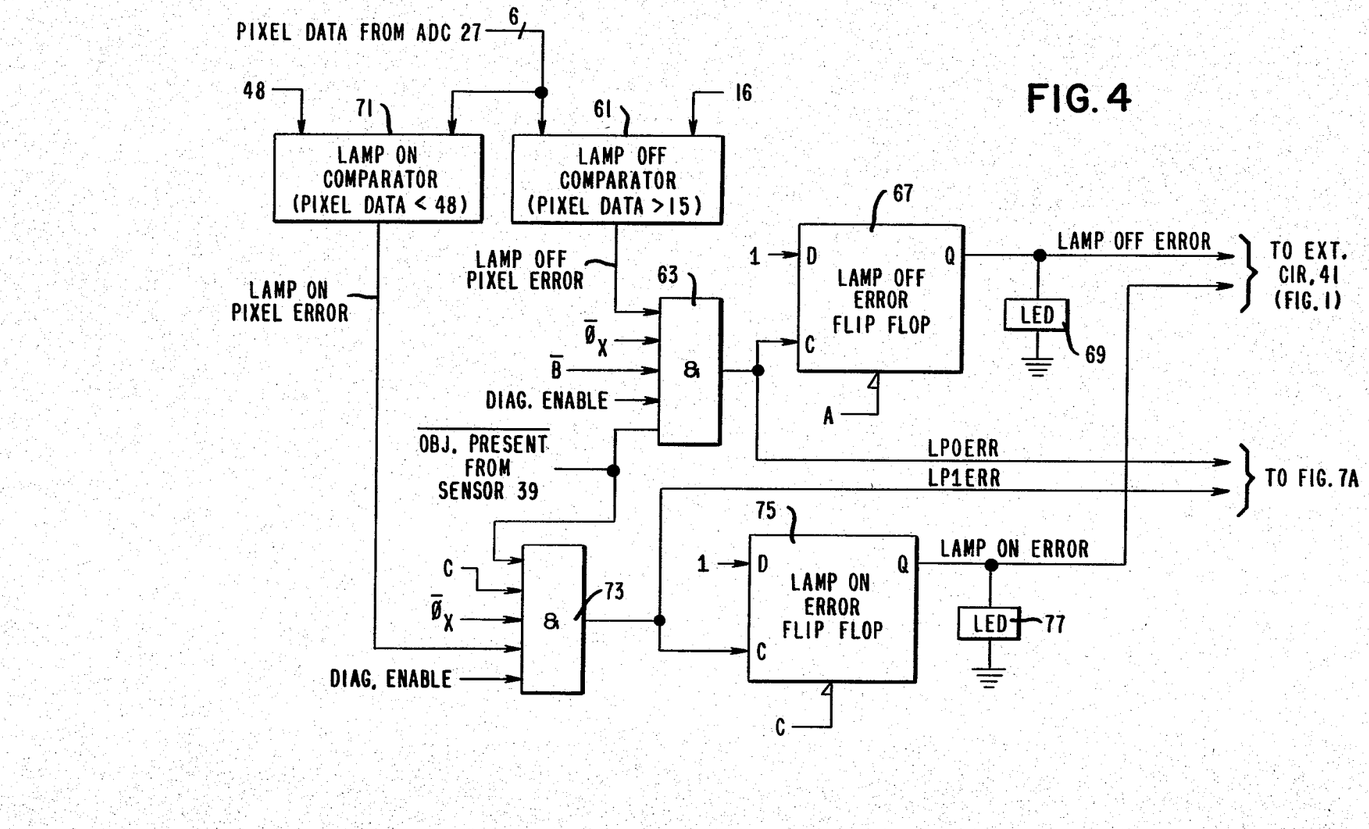
FIGS. 4, 5, 7A and 7B are schematic block diagrams which in combination, form the pixel error detection circuit of FIG. 1.

Referring now to FIG. 4, during the first mode of operation (when lamp 15 is "off") the digital pixel data from ADC 27 is applied to a lamp off comparator 61. The comparator 61 compares each digitized pixel in a line scan of pixel data against a reference digital 16 signal. If any digitized pixel is greater in amplitude than 15, the comparator 61 develops a 1 state "lamp off pixel error" signal to indicate an associated defective element in the array 21 during the first mode of operation.

A lamp off pixel error is applied to an AND gate 63. Also applied to the AND gate 63 is the $\overline{\emptyset_x}$ clock (FIG. 1), the $\overline{B}$ signal (FIG. 3) from inverter 55 (FIG. 2), a diagnostic enable gate or signal (FIG. 5—to be explained) and the object present signal from sensor 39 (FIG. 1). As long as no object 17 is present in the track 13 (FIG. 1) and a 1 state lamp off pixel error occurs during a 1 state diagnostic enable gate before the end of the lamp off test period ($T_3$-$T_5$ in FIG. 3), the AND gate 63 will develop a 1 state LPOERR signal (to indicate a lamp off pixel error) for each lamp off pixel error developed by comparator 61. This 1 state LPOERR signal will be developed during the positive alternation of the associated $\overline{\emptyset_x}$ clock, which will occur after the output of the comparator 61 has stabilized. Each LPOERR signal is applied to the clock input of lamp off error flip flop 67.

Referring also to FIG. 3, it can be seen that output A of delay 49 maintains a clear (0 state) signal on the clear input of flip flop 67 until time $T_3$ and that AND gate 63 cannot generate a LPOERR signal after $\overline{B}$ goes low at time $T_5$. Consequently, AND gate 63 can only develop an LPOERR signal during the 1 second lamp off test period between time $T_3$ and time $T_5$.

The first LPOERR signal generated by AND gate 63 during the lamp off test period, $T_3$-$T_5$, clocks the flip flop 67 to cause the flip flop 67 to develop a "lamp off error" signal at its Q output. The lamp off error signal from flip flop 67 turns on a LED 69 to indicate that at least one element in array 21 (FIG. 1) is defective during the first mode of operation. This lamp off error signal can also be applied to the external circuitry 41 for utilization thereby.

During the second mode of operation (when lamp 15 is "on") the digital pixel data from ADC 27 is applied to a lamp on comparator 71. This comparator 71 compares each digitized pixel in a line scan of pixel data against a reference digital 48 signal. If any digitized pixel is less in amplitude than 48, comparator develops a 1 state "lamp on pixel error" signal to indicate an associated weak element in the array 21 during the second mode of operation. However, it should be realized that, if the comparator 71 outputs a sequence of lamp on pixel errors, the lamp 15 may be weak, the power supply 35 voltage to lamp 15 may be low, or the whole array 21 of elements may be dirty or defective.

A lamp on pixel error is applied to an AND gate 73, along with the $\overline{\emptyset_x}$ clock, the object present signal from sensor 39, the diagnostic enable gate or signal and the C signal (FIG. 3) from delay 57 (FIG. 2). As long as no object 17 is present in the track 13 (FIG. 1) and a 1 state lamp on pixel error occurs during a 1 state diagnostic enable gate after the start of the lamp on test period ($T_7$ in FIG. 3), the AND gate 73 will develop a 1 state LPIERR signal (to indicate a lamp on error) for each lamp on pixel error developed by comparator 71. This 1 state LPIERR signal will be developed during the positive alternation of the associated $\overline{\emptyset_x}$ clock, which will occur after the output of the comparator 71 has stabilized. Each LPIERR signal is applied to the clock input of lamp on error flip flop 75.

Referring again also to FIG. 3, it can be seen that output C of delay 57 maintains a clear (0 state) signal on the clear input of flip flop 75 until time $T_7$ and that AND gate 73 cannot generate an LPIERR signal until after C goes high at time $T_7$.

The first LPIERR signal generated by AND gate 73 during the lamp on test period (from time $T_7$ until another diagnostic operation is initiated at another time $T_0$) clocks the flip flop 75 to cause the flip flop 75 to develop a "lamp on error" signal at its Q output. The lamp on error signal from flip flop 75 turns on an LED 77 to indicate that at least one element in array 21 (FIG. 1) is defective during the second mode of operation. This lamp on error signal can also be applied to the external circuitry 41 for utilization thereby.

It can be seen in FIG. 4 that the pixel data from ADC 27 is simultaneously applied to the inputs of both of comparators 61 and 71. However, even though a "lamp on pixel error" can readily be generated by the comparator 71 during the first mode of operation (lamp 15 "off"), AND gate 73 will not develop any LPIERR signals during this period of time ($T_3$-$T_5$) since the C signal (FIG. 3) is in a 0 state to disable AND gate 73. In a similar manner a "lamp off pixel error" can readily be generated by comparator 61 during the second mode of operation (lamp 15 "on"). However, a 0 state $\overline{B}$ signal will prevent the AND gate 63 from generating any LPOERR signals during this period of time (from $T_5$ on).

Figure 5:
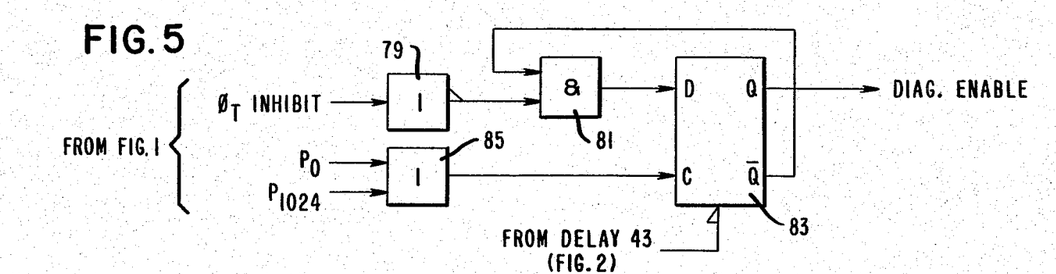

Referring now to FIG. 5, a circuit is shown for generating a "diagnostic (diag.) enable" gate or signal which is used by the circuitry of FIG. 7 (to be discussed). This diag. enable gate is a synchronous signal which is precisely timed during each scan line during a diagnostic operation. For ease of understanding the operation of the circuit of FIG. 5, the waveforms of FIG. 6 will also be referred to.

A "$\emptyset_T$ inhibit" signal from external circuitry 41 (FIG. 1) is inverted by a logical inverter 79 and applied to one input of an AND gate 81. The output of AND gate 81 is applied to the D input of flip flop 83. The $\overline{Q}$ output of flip flop 83 is connected to the second input of AND gate 81. The diag. enable gate is taken from the Q output of the flip flop 83.

Figure 6:
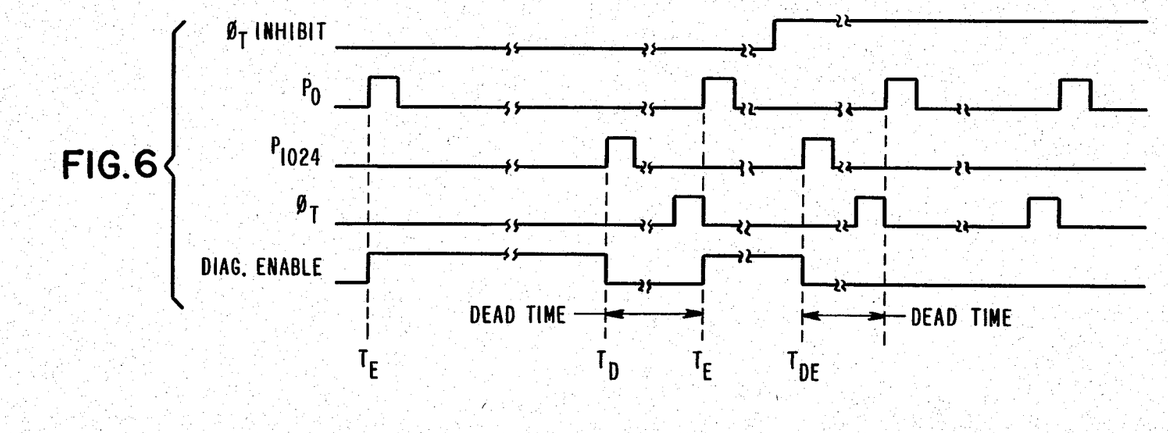
FIG. 6 illustrate waveforms useful in explaining the operation of the circuit shown in FIG. 5.

As shown in FIG. 6 the $\emptyset_T$ inhibit signal is in a logical 0 state (until after an evaluation operation is requested by external circuitry 41). Thus, the inversion of the $\emptyset_T$ inhibit signal by logical inverter 79 causes the AND gate 81 to operate as a repeater of the logical state of the $\overline{Q}$ output of the flip flop 83.

The output of delay 43 (see FIGS. 2 and 3) is applied to the clear input of the flip flop 83 to clear that flip flop before time $T_1$ (FIG. 3). Upon being cleared, the Q and $\overline{Q}$ outputs of the flip flop 83 are in respective 0 and 1 logical states. The output of AND gate 81 thus applies a logic 1 to the D input of flip flop 83. However, the flip flop 83 cannot change its output states until it is clocked.

Signal $P_0$, which is developed by pixel counter 25 (FIG. 1) at the start of a scan line (time $T_E$ in FIG. 6), is applied through an OR gate 85 to clock the flip flop 83 to change its output states and initiate a diag. enable gate. The now 0 state $\overline{Q}$ output of flip flop 83 is then applied through the enabled AND gate 81 to the D input of flip flop 83.

After 1024 digitized pixels (0–1023) in the pixel data from ADC 27 have been processed by the circuitry of FIG. 4, pulse $P_{1024}$ from counter 25 (FIG. 1) is passed through the OR gate 85 to again clock the flip flop 83 to change its output states and terminate the diag. enable gate at time $T_D$ for that scan.

It can therefore be seen that, during each line scan that occurs during the diagnostic operation, the $P_0$ and $P_{1024}$ pulses respectively initiate and terminate the diag. enable gate associated with that line scan. As a result, a diagnostic test for defective pixels is performed during each scan line that occurs during the diagnostic operation.

As shown in FIG. 6, there may be a "dead time" between the end of a diagnostic enable gate (at time $T_D$) in one line scan and the start of the next line scan (at time $T_E$). During that dead time, no pixel data from ADC 27 (FIG. 1) is being processed by the pixel error detection circuit 29. As mentioned before, this is a period of time in a line scan in which black and white references internal to the imaging sensor array 21 may be clocked out of the array.

Figure 7A:
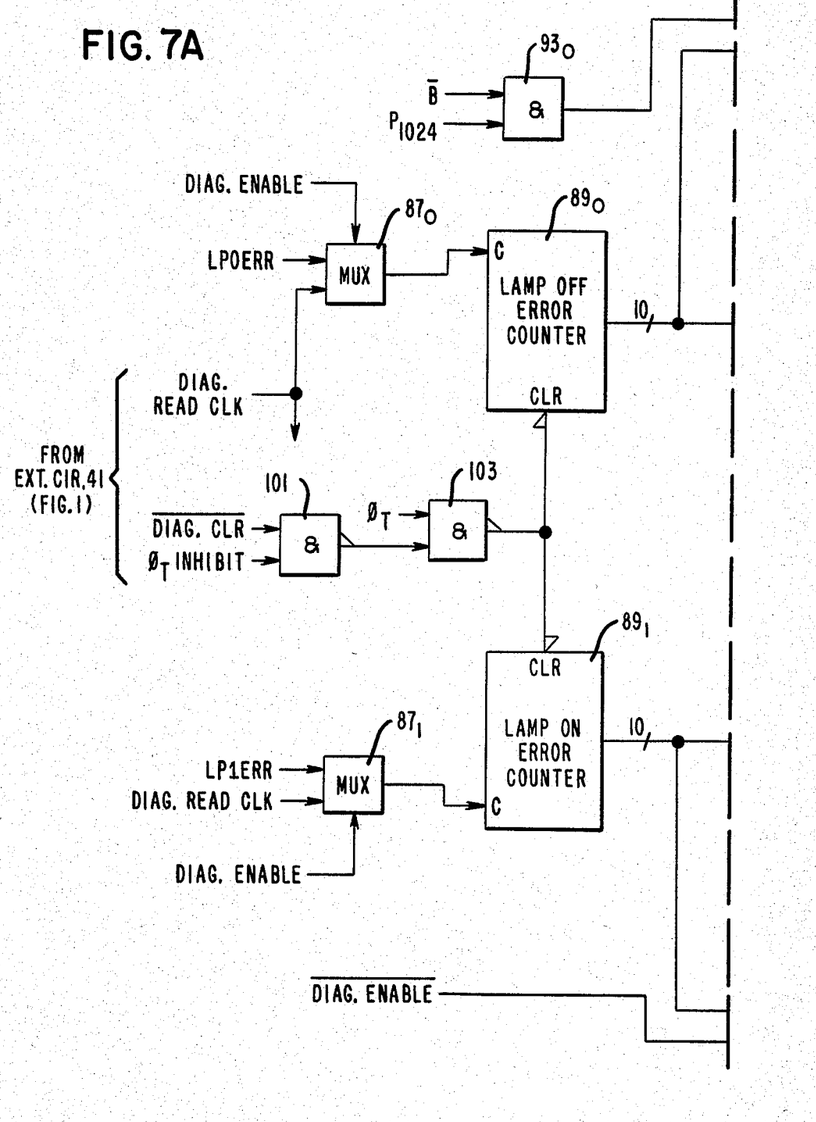
Figure 7B:
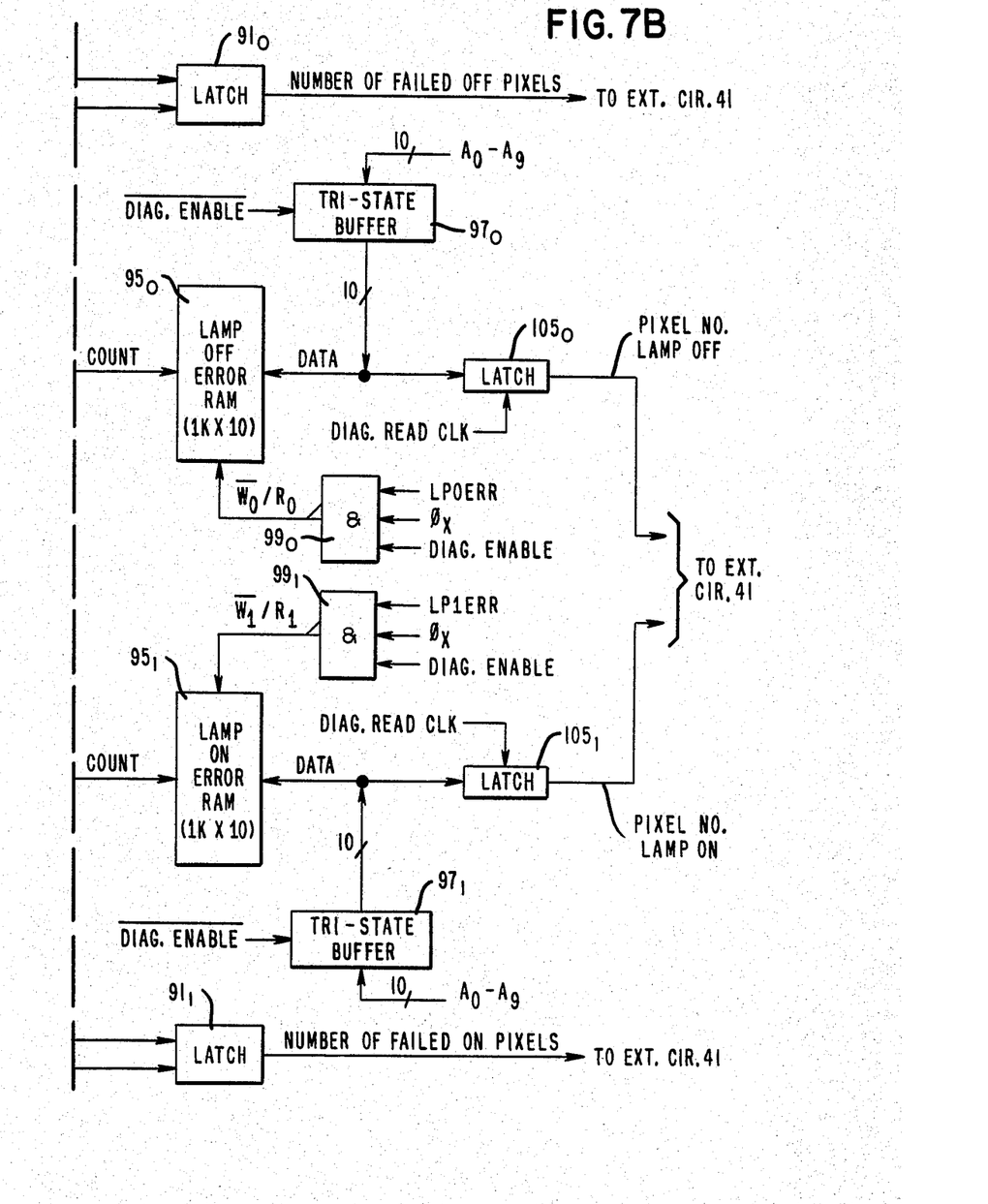

Referring now to FIGS. 7A and 7B, the last part of the circuitry of the pixel error detection circuit 29 will now be discussed.

As mentioned before there are basically two operations of the system of FIG. 1. The first operation is the diagnostic operation during which the pixel error tests are performed for each of first (lamp 15 "off") and second (lamp 15 "on") modes of operation. The second operation is the evaluation operation during which the results of the pixel error tests are examined. Essentially the state of the "$\emptyset_T$ inhibit" signal will determine whether the system is in a diagnostic operation or an evaluation operation. When $\emptyset_T$ inhibit is low (a logical 0), the system is in a diagnostic operation. Conversely, when $\emptyset_T$ inhibit is high (a logical 1), the system is in an evaluation mode.

DIAGNOSTIC OPERATION

During a diagnostic operation the $\emptyset_T$ inhibit and diagnostic clear signals from external circuitry 41 are respectively in logical 0 (low) and logical 1 (high) states and there are no diagnostic read clocks applied from external circuitry 41. As explained in the discussion on FIGS. 2 and 3, a diagnostic operation begins with the initial turn on of the system or can be begun at any time after the system is in operation by utilizing an external reset pulse from external circuitry 41 to momentarily close electronic switch 59 to short out capacitor C1 in the on/off control circuit 31 of FIG. 2. It will also be recalled that a 1 state diagnostic enable gate (FIGS. 5 and 6) is generated during each scan line during the 1-second long diagnostic operation.

The diagnostic enable gate causes a multiplexer (MUX $87_0$ to pass any LPOERR (lamp off error) signals to the count input (C) of a lamp off error counter $89_0$ to be counted. Each LPOERR signal increments the counter $89_0$ by a count of 1. Thus, the counter 890 keeps track of the total number of pixel errors that occur during a scan. The output count of counter $89_0$ is also applied to a latch $91_0$, which is enabled by each 1 state output of an AND gate $93_0$ to latch the output count of the counter $89_0$. The $\overline{B}$ signal (FIG. 2) and the $P_{1024}$ pulse (FIG. 1) are inputted to the AND gate $93_0$.

During each scan in the first mode of operation (lamp 15 "off"), the $\overline{B}$ signal is in a logical 1 state to enable the AND gate $93_0$ at each $P_{1024}$ pulse time to latch the output count of counter $89_0$ into latch $91_0$. This output count of counter $89_0$, at the time of the $P_{1024}$ pulse, is the total number of failed off pixels that were developed in the prior scan during the lamp off test. This total number of failed off pixels, that is stored in the latch $91_0$, is applied to the external circuitry 41.

Each output count of counter $89_0$ is also applied as a 10-bit address to a lamp off error RAM (random access memory) $95_0$. RAM $95_0$ is a $1K \times 10$-bit RAM which can store 1024 different 10-bit words. A 10-bit address from counter $89_0$ and a RAM storage capacity of 1024 words are needed in case all of the 1024 pixels in the array 21 (FIG. 1) are defective.

The pixel number or address A0–A9 from pixel counter 25 (FIG. 1) is applied to a 10-bit tri-state buffer $97_0$, which buffer can be implemented by means of two Fairchild 74LS367A 3-state buffers. Buffer $97_0$ is enabled by a diagnostic enable signal (from the $\overline{Q}$ output of flip flop 83 in FIG. 5) to pass the pixel address A0–A9 to RAM $95_0$ via data lines (DATA).

In the first mode of operation (lamp 15 "off"), the $\emptyset_X$ pixel clocks, the diagnostic enable signal and any LPOERR pixel error signals are inputted to a NAND gate $99_0$ to enable the NAND gate $99_0$ to develop a $\overline{W}_0/R_0$ signal to control the write/read operations of the RAM $95_0$. Any LPOERR error that occurs during the period of the diagnostic enable gate is passed at clock time $\emptyset_X$ through the NAND gate $99_0$ as a logical 0 write signal ($\overline{W}_0$) to enable the RAM $95_0$ to write the address (A0–A9) of the failed off pixel into the location of the RAM $95_0$ specified by the address count from the counter $89_0$. In this manner RAM $95_0$ sequentially stores the address of each failed pixel number that occurred during a first mode scan (lamp 15 "off"). When at least one of the inputs to NAND gate $99_0$ is in a 0 state (i.e. no pixel error developed during a given pixel time), NAND gate $99_0$ develops a logical 1 read signal ($R_0$)

At the end of each scan line during the diagnostic operation, the lamp off error counter $89_0$ is cleared and a new count of LPOERR errors is developed by the counter $89_0$. During the next scan the counter $89_0$ will again be incremented by the LPOERR to again cause the address of any failed pixel number that occurs during that first mode scan to be rewritten into the location of RAM $95_0$ that corresponds with the associated count of counter $89_0$. Such clearing of the counter $89_0$ at the end of each scan is necessary to prevent the counter $89_0$ from accumulating the same pixel errors in consecutive scan lines during the diagnostic operation.

Counter $89_0$ is cleared at the end of each scan line in the following manner. The diagnostic clear and $\emptyset_T$ inhibit signals are applied to a NAND gate 101, which has its output coupled to a first input of another NAND gate 103. It will be recalled that the diagnostic clear signal is high and the $\emptyset_T$ inhibit signal is low during the diagnostic operation. Therefore, the NAND gate 101 will develop and apply a logical 1 state signal to the first input of NAND 103 during the entire diagnostic operation. Clock $\emptyset_T$ is applied to a second input of the NAND gate 103 which has its output, in turn, connected to the clear input of counter $89_0$. As a result the clock $\emptyset_T$, which occurs at the end of each scan line, will clear the count of the counter $89_0$ at the end of each scan line that occurs during the diagnostic operation.

As shown in FIG. 3, at the end of the lamp off tests (time $T_5$) the $\overline{B}$ signal goes low to disable the upper input of AND gate $93_0$. Thus, the last count of the counter $89_0$ that was latched into latch $91_0$ (at the time of the prior $P_{1024}$ pulse) will remain in the latch $91_0$ until another first mode of operation is initiated during a subsequent diagnostic operation. This current output count in latch $91_0$ is the total number of failed off pixels that were developed in the last scan of the lamp off test. The current total number of failed off pixels, that is now stored in the latch $91_0$, is applied to the external circuitry 41. The following $\emptyset_T$ clock clears the count of counter $89_0$.

At time $T_7$(FIG. 3) the system starts the lamp on test. For the lamp on test the system uses circuits $87_1$, $89_1$, $91_1$, $95_1$, $97_1$ and $99_1$, which are respectively similar in structure and operation to the circuits $87_0$, $89_0$, $91_0$, $95_0$, $97_0$ and $99_0$. However, the circuits $87_1$, $89_1$, $91_1$, $95_1$, $97_1$ and $99_1$ utilize the LPIERR (lamp on error) signal applied to MUX $87_1$ to develop the total "number of failed on pixels" during a scan at the output of lamp on error counter $89_1$ and to sequentially store in lamp on error RAM $95_1$ the address of each failed pixel number that occurred during a second mode scan (lamp 15 "on"). The $\overline{W}_1/R_1$ signal from NAND gate $99_1$ is also applied to the RAM $95_1$ to control the write/read operation of the RAM $95_1$ in the same manner discussed before, but as a function of any LPIERR errors developed during the second mode of operation.

At the end of each diagnostic enable gate during the lamp on test, the rising edge of the 1-state $\overline{\text{diagnostic}}$ $\overline{\text{enable}}$ signal (from the $\overline{Q}$ output of flip flop 83 in FIG. 5) clocks the current output count of counter $89_1$ into latch $91_1$. This current output count is the total number of failed on pixels that were developed in the prior scan of the lamp on test. The current total number of failed on pixels, that is now stored in latch $91_1$, is also applied to the external circuitry 41. The following $\emptyset_T$ clock clears the count of counter $89_1$.

EVALUATION OPERATION

The evaluation operation allows the system to read out the addresses of the failed pixels from the RAMs $95_0$ and $95_1$. To initiate an evaluation operation, the $\emptyset_T$ inhibit signal asynchronously changes, or is asynchronously changed, to a high level or logical 1. As shown in FIG. 5, the inversion of this 1state $\emptyset_T$ inhibit signal by inverter 79 disables AND gate 81 and thereby prevents the flip flop 83 from generating any further diagnostic enable gates during the evaluation operation. However, as shown in FIGS. 5 and 6, the current diagnostic enable gate being generated by the flip flop 83 is allowed to be completed before the diagnostic operation is ended.

At the end of the last diagnostic gate that occurs after the evaluation operation is initiated, the rising edge of the 1-state $\overline{\text{diagnostic enable}}$ signal clocks the output count of the counter $89_1$ into latch $91_1$. Thus, at this time latches $91_0$ and $91_1$ respectively contain the final numbers of failed off and failed on pixels that were produced during the diagnostic operation.

After the current diagnostic enable gate is completed, external circuitry 41 has control of the pixel error detection circuit 29 to find out what specific pixel errors were detected during the diagnostic operation.

The 1 state $\emptyset_T$ inhibit signal and the unchanged 1 state diagnostic clear signal cause the NAND gate 101 to output a logical 0 to NAND gate 103. As a result, the output of the NAND gate 103 applies a 1 state to the clear inputs of counters $89_0$ and $89_1$. The 1 state signal from NAND 101 prevents the NAND gate 103 from clearing the counts of the counters $89_0$ and $89_1$ at the time of the end of the scan clock $\emptyset_T$.

Since the $\emptyset_T$ inhibit allows the current diagnostic enable gate to be completed before the diagnostic operation is ended, the MUX's $87_0$ and $87_1$ are still enabled by the current 1 state diagnostic enable gate. It should be recalled that the current total number of failed off pixels has been stored in latch $91_0$ at the end of the previous lamp off test. In addition, during the current lamp on test, no LPOERR error signals are developed and hence none are applied to MUX $87_0$. However, the LPIERR error signals that are detected during the current second mode scan (lamp 15 "on") are sequentially passed to the lamp on error counter $89_1$ to be counted and subsequently stored in the latch $91_1$ as the total number of failed on pixels, as previously discussed.

After the 1 state $\emptyset_T$ inhibit signal is generated by the external circuitry 41, the current diagnostic enable gate or signal continues at a 1-state level until it is completed at the time $T_{DE}$ of the $P_{1024}$ signal, as shown in FIG. 6. At this time the diagnostic enable signal changes to a 0 state. The 0-state of the diagnostic enable signal causes the MUXs $87_0$ and $87_1$ to select the diagnostic read clock position. However, no diagnostic read clocks are generated by the external circuitry 41 at this time. Hence, no signals are passed by the MUXs at this time.

The 0-state of the diagnostic enable signal also causes NAND gate $99_0$ to apply a 1 state read signal ($R_0$) to RAM $95_0$ and NAND gate $99_1$ to apply a 1 state read signal ($R_1$) to RAM $95_1$. As a result, both of the RAMs $95_0$ and $95_1$ are in their read modes. The 10-bit outputs of the RAMs $95_0$ and $95_1$ are respectively applied to latches $105_0$ and $105_1$. However, these latches $105_0$ and $105_1$ cannot pass data from the RAMs $95_0$ and $95_1$ to the external circuitry 41 until the latches start receiving diagnostic read clocks from the external circuitry 41.

It should be noted at this time that each of the latches $91_0$, $91_1$, $105_0$ and $105_1$ is a 10-bit latch which can be implemented by means of three Fairchild 74LS375 4-bit latches. It should also be noted that, after being cleared, each of the counters $89_0$ and $89_1$ develops a 0 count address output.

Upon the completion of the last 1 state diagnostic enable gate after the $\emptyset_T$ inhibit signal is applied, six different types of pixel error information have been developed by the system. These are as follows:

1. The lamp off error signal from flip flop 67 (FIG. 4).
2. The lamp on error signal from flip flop 75 (FIG. 4).
3. The number of failed off pixels in latch $91_0$ (FIGS. 7A and 7B).
4. The number of failed on pixels in latch $91_1$ (FIGS. 7A and 7B).
5. The specific pixel numbers or identities of the failed lamp off pixels in RAM $95_0$ (FIGS. 7A and 7B).
6. The specific pixel numbers or identities of the failed lamp on pixels in RAM $95_1$ (FIGS. 7A and 7B).

The lamp off error just indicates that at least one of the 1024 pixels (in the array 21) is defective when the lamp 15 is "off". The lamp on error just indicates that at least one of the 1024 pixels is defective when the lamp 15 is "on". Neither of these signals provides any information as to the total number or identity of failed or defective pixels. The other four signals supply this missing information for the lamp off and lamp on tests.

A suitable time after the 1-state $\emptyset_T$ inhibit signal is generated by external circuitry 41, a 0-state diagnostic clear is applied to NAND gate 101 to cause it to apply a 1 state signal to NAND gate 103. The next $\emptyset_T$ clock that is applied to NAND gate 103 causes NAND gate 103 to develop a 0 state signal to clear the count from both of the counters $89_0$ and $89_1$.

It will be recalled that at this time the total number of failed off pixels is stored in latch $91_0$, while the pixel numbers or addresses of those failed off pixels are stored in RAM $95_0$. Similarly, the total number of failed on pixels is stored in latch $91_1$, while the pixel numbers or addresses of those failed on pixels are stored in RAM $95_1$. In addition, the count of each of the counters $89_0$ and $89_1$ has been cleared to zero (0) and both of the RAMs $95_0$ and $95_1$ are in their read modes.

The 0 address counts from the counters $89_0$ and $89_1$ cause the RAMs $95_0$ and $95_1$ to respectively apply the failed pixel numbers stored in their 0 address locations to the inputs of the latches $105_0$ and $105_1$, respectively. The system is now ready to start outputting data to the external circuitry 41 to identify all of the defective pixels that were detected during both of the lamp off and lamp on tests during the diagnostic operation.

Diagnostic read clocks are now supplied from the external circuitry 41 to accomplish the outputting of data from the RAMs $95_0$ and $95_1$. These diagnostic read clocks, like the external reset, $\emptyset_T$ inhibit and diagnostic clear signals, may be derived from switches, push buttons, a diagnostic processor, discrete logic circuitry or from any other suitable source.

The first diagnostic read clock enables latch $105_0$ to store the lamp off failed pixel number or address being outputted from location 0 of RAM $95_0$ and enables latch $105_1$ to store the lamp off failed pixel number or address being outputted from location 0 of RAM $95_1$. This first diagnostic read clock also increments the counters $89_0$ and $89_1$ to output address counts of 1. In response to these address counts of 1, the failed pixel numbers stored in location 1 of the RAMs $95_0$ and $95_1$ are respectively read out of the RAMs and applied to the inputs of latches $105_0$ and $105_1$. However this new data from the RAMs $95_0$ and $95_1$ will not be latched into the latches $105_0$ and $105_1$ until the second diagnostic read clock occurs.

For each subsequent diagnostic read clock, the previous pixel number data being outputted from the RAMs $95_0$ and $95_1$ is latched into latches $105_0$ and $105_1$, while the counters $89_0$ and $89_1$ are again incremented by one to cause the RAMs to output new data to the inputs of latches $105_0$ and $105_1$.

In the event that the numbers of failures stored in the latches $91_0$ and $91_1$ are different, that one of the latches $91_0$ and $91_1$ that stores the higher number of failures would determine the total number of diagnostic read clocks being supplied from the external circuitry 41. In this case only the failed pixel number data read out from the number of RAM locations specified by the associated latch would be used. All other data would be ignored. For example, assume that latch $91_1$ indicates 10 pixel failures while latch $91_0$ indicates 5 pixel failures. As a result, only 10 diagnostic read clocks would be supplied by external circuitry 41. All of the data read out from locations 0 through 9 of RAM $95_1$ would be utilized by external circuitry 41. On the other hand, only the data read out from locations 0 through 4 of RAM $95_0$ would be utilized by external circuitry 41. The data read out from locations 5 through 9 of RAM $95_0$ would be ignored.

External circuitry 41 could also include LED (light emitting diode) circuits (not shown) to visually indicate the defective pixel numbers.

The pixel failure information stored in the latches $91_0$ and $91_1$ and/or RAMs $95_0$ and $95_1$ could be used to determine the seriousness of the problem with an imaging sensor array 21 such as a CCD. If no pixel failures are detected the system may be operating perfectly. If, for example, less than 5 pixel failures are detected, the degradation in the imaging of objects or documents may be so minor that only an equipment warning status would be warranted. In this case the system would still be operated while a technician was summoned to repair the imaging sensor array 21 at his convenience. On the other hand, if, for example, 5 or more pixel failures are detected, the degradation in the imaging of objects or documents may be so severe that an equipment failure status may be required. In this case the equipment should be turned off and a technician summoned immediately to correct the problem.

The invention thus provides a system and method for automatically testing, detecting and identifying any picture element failures in a multielement imaging sensor array during each of lamp off and lamp on modes of operation.

While the salient features of the invention have been illustrated and described, it should be readily apparent to those skilled in the art that many other changes and modifications can be made in the system and method of the invention presented without departing from the spirit and true scope of the invention. Accordingly, the present invention should be considered as encompassing all such changes and modifications of the invention that fall within the broad scope of the invention as defined by the appended claims.

What is claimed is:

1. A system comprising:
a reference background for reflecting radiant energy impinging thereon;
means for illuminating said reference background with radiant energy during a mode of operation;
scanning means having at least one array containing N image viewing elements for providing N reference signal pixels for each scan of said reference background;
first means for producing an error signal during said mode of operation whenever any given reference signal pixel is less than a reference level; and
second means responsive to said error signal for indicating that at least one of said elements in said array is defective.

2. The system of claim 1 wherein said array is a charge coupled device array.

3. The system of claim 1 further including:
means responsive to the presence of an object moving along a path toward said reference background for preventing said first means from producing said error signal during said mode of operation.

4. The system of claim 1 further including:
means responsive to error signals from said first means for determining the number of defective ones of said elements in said array during said mode of operation.

5. The system of claim 1 further including:
means for selectively counting the number of said error signals in each scan line to selectively determine the number of defective ones of said elements in said array during said mode of operation.

6. The system of claim 5 further including:
means for sequentially generating N address signals respectively corresponding to the positions of said N imaging viewing elements in said array.

7. The system of claim 6 further including:
means selectively responsive to address signals from said generating means and count signals from said determining means for identifying the defective ones of said elements in said array during said mode of operation.

8. The system of claim 1 wherein said illuminating means prevents the illumination of said reference background during a different mode of operation; and said system further includes:
third means for producing a second error signal during said different mode of operation whenever any given reference signal pixel is less than a second reference level; and
fourth means responsive to a second error signal for indicating that at least one of said elements in said array is defective.

9. The system of claim 8 wherein said illuminating means includes:
a source of radiant energy;
a power supply for supplying a voltage to said source when said power is enabled; and
control means for disabling said power supply to prevent said source from illuminating said reference background during said different mode of operation and for enabling said power supply to cause said source to illuminate said reference background during said mode of operation.

10. The system of claim 8 wherein said array is a charge coupled device array.

11. The system of claim 8 further including:
means responsive to the presence of an object moving along a path toward said reference background for preventing said first and third means from selectively producing said error signals and second error signals until a predetermined time after the object is no longer present.

12. The system of claim 8 further including:
first determining means responsive to said error signals for determining the number of defective ones of said elements in said array during said mode of operation; and
second determining means responsive to second error signals for determining the number of defective ones of said elements in said array during said different mode of operation.

13. The system of claim 8 further including:
first counting means for selectively counting the number of said error signals in each scan line to selectively determine the number of defective ones of said elements in said array during said mode of operation; and
second counting means for selectively counting the number of second error signals in each scan line to selectively determine the number of defective ones of said elements in said array during said different mode of oper- ation.

14. The system of claim 13 further including:
means for sequentially generating N address signals respectively corresponding to the positions of said N imaging viewing elements in said array.

15. The system of claim 14 further including:
first identifying means selectively responsive to address signals and count signals from said first determining means for identifying the defective ones of said N elements in said array during said mode of operation; and
second identifying means selectively responsive to address signals and count signals from said second determining means for identifying the defective ones of said N elements in said array during said different mode of oper- ation.

16. The system of claim 15 further including:
output means for selectively developing a plurality of control signals to control the operations of said first and second determining means and said first and second counting means.

17. A method for automatically detecting any picture element failures in a multielement scanning array, said method comprising the steps of:
controlling a light source to not illuminate a reference background during a first mode of operation and to illuminate the reference background in a second mode of operation;
scanning the reference background during first and second modes of operation;
outputting from the array a first sequence of scans of N reference signal pixels for each scan during the first mode of operation and a second sequence of scans of N reference signal pixels for each scan during the second mode of operation;
producing a first error signal during the first mode of operation for each reference signal pixel higher in amplitude than a first signal level and a second error signal during the second mode of operation for each reference signal pixel lower in amplitude than a second level;
counting the number of first error signals in each scan to selectively determine the number of defective elements in the array during the first mode of operation and the number of second error signals in each scan to selectively determine the number of defective elements in the array during the first mode of operation; and utilizing address signals and count signals during each of the first and second modes of operation to identify the defective elements in the array during each of the first and second modes of operation.

* * * * *